US009829393B2

(12) United States Patent
Claus

(10) Patent No.: US 9,829,393 B2
(45) Date of Patent: Nov. 28, 2017

(54) METHOD FOR DETERMINING THE AMBIENT TEMPERATURE OF A MOBILE DEVICE

(71) Applicant: Robert Bosch GmbH, Stuttgart (DE)

(72) Inventor: Thomas Claus, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 428 days.

(21) Appl. No.: 14/574,574

(22) Filed: Dec. 18, 2014

(65) Prior Publication Data
US 2015/0177076 A1 Jun. 25, 2015

(30) Foreign Application Priority Data
Dec. 19, 2013 (DE) .................. 10 2013 226 695

(51) Int. Cl.
*G01K 7/42* (2006.01)

(52) U.S. Cl.
CPC ....................... *G01K 7/42* (2013.01)

(58) Field of Classification Search
CPC .......... G01K 7/42; G01K 7/425; G01K 7/427; H04M 2250/12; G06F 2217/80
See application file for complete search history.

(56) References Cited

U.S. PATENT DOCUMENTS

| | | | | |
|---|---|---|---|---|
| 6,088,661 A | * | 7/2000 | Poublon | F02D 41/18 374/133 |
| 2003/0064749 A1 | * | 4/2003 | Soini | H04M 1/21 455/556.1 |
| 2005/0244014 A1 | * | 11/2005 | Elko | G01K 11/22 381/58 |
| 2006/0167647 A1 | * | 7/2006 | Krumm | G01W 1/17 702/130 |
| 2011/0119018 A1 | | 5/2011 | Skarp | |
| 2011/0301777 A1 | * | 12/2011 | Cox | G06F 1/206 700/299 |
| 2012/0095312 A1 | * | 4/2012 | Ramey | A61B 5/002 600/365 |
| 2013/0099008 A1 | * | 4/2013 | Aljabari | G05D 23/1932 236/1 C |
| 2014/0163765 A1 | * | 6/2014 | Jain | G06F 1/206 700/300 |
| 2014/0311209 A1 | * | 10/2014 | Niederberger | G01K 15/007 73/1.06 |

(Continued)

FOREIGN PATENT DOCUMENTS

DE 60223466 9/2008
DE 102010044912 4/2011

(Continued)

*Primary Examiner* — Lisa Caputo
*Assistant Examiner* — Philip Cotey
(74) *Attorney, Agent, or Firm* — Norton Rose Fulbright US LLP; Gerard Messina

(57) ABSTRACT

A method for determining the ambient temperature of a mobile device including: determining an operating condition of the mobile device for determining a thermal condition of the mobile device in a first task, estimating a dynamic parameter, which characterizes the thermal behavior of the mobile device in a second task, and calculating an ambient temperature of the mobile device with the aid of the dynamic parameter in a third task.

9 Claims, 5 Drawing Sheets

(56) References Cited

U.S. PATENT DOCUMENTS

| | | | | |
|---|---|---|---|---|
| 2014/0321503 A1* | 10/2014 | Niederberger | ........... | G01K 1/20 374/137 |
| 2014/0328367 A1* | 11/2014 | Niederberger | ........... | G01K 1/20 374/1 |
| 2014/0328368 A1* | 11/2014 | Niederberger | ........... | G01K 1/20 374/1 |
| 2014/0355649 A1* | 12/2014 | Niederberger | ....... | G01D 3/0365 374/152 |
| 2014/0379290 A1* | 12/2014 | Wlodarczyk | ............ | G01K 7/42 702/130 |

FOREIGN PATENT DOCUMENTS

| | | |
|---|---|---|
| EP | 1285841 | 2/2003 |
| EP | 1301014 | 4/2003 |

\* cited by examiner

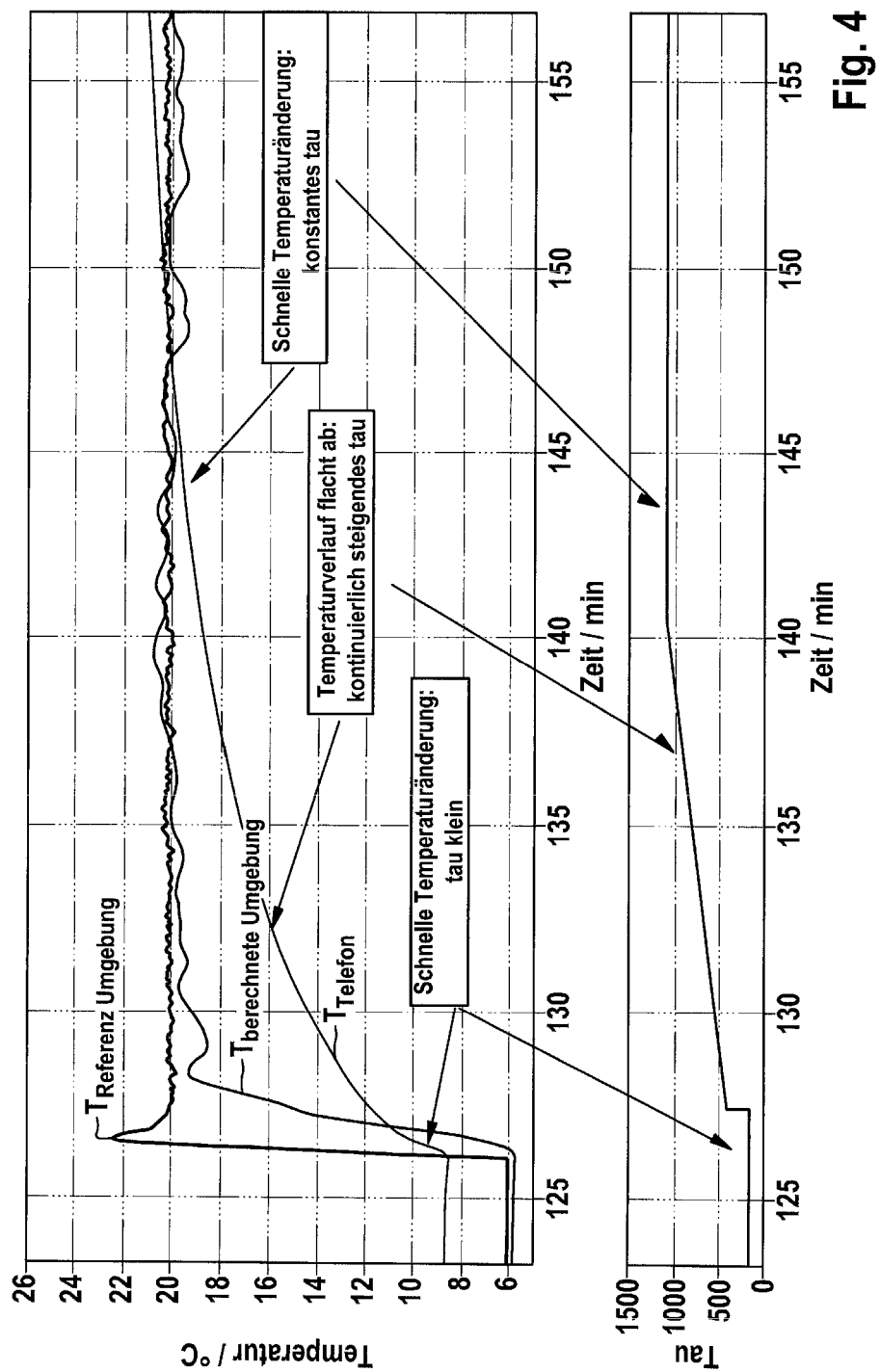

US 9,829,393 B2

METHOD FOR DETERMINING THE AMBIENT TEMPERATURE OF A MOBILE DEVICE

RELATED APPLICATION INFORMATION

The present application claims priority to and the benefit of German patent application no. 10 2013 226 695.2, which was filed in Germany on Dec. 19, 2013, the disclosure of which is incorporated herein by reference.

FIELD OF THE INVENTION

The present invention relates to a method for determining the ambient temperature of a mobile device.

BACKGROUND INFORMATION

Several smart phones have recently included an integrated ambient temperature sensor. However, the device temperature is not equal to the ambient temperature due to self-heating of the devices. The determination of the ambient temperature is therefore possibly imprecise. In order to improve this, multiple temperature sensors are also integrated into some mobile devices. Multiple temperature sensors in a mobile telephone measure the device temperature at different locations in the device. The ambient temperature is estimated with the aid of the internal temperature sensors and the power consumption (heat) of the device. Even so, uncertainty remains concerning the actual ambient temperature.

SUMMARY OF THE INVENTION

The present invention relates to a method for determining the ambient temperature of a mobile device including the steps:
determining an operating condition of the mobile device for determining a thermal condition of the mobile device in a first step,
estimating a dynamic parameter τ(t), which characterizes the thermal behavior of the mobile device in a second step,
calculating an ambient temperature ($T_{amb}$) of the mobile device with the aid of the dynamic parameter τ(t) in a third step.

Advantageously, the method according to the present invention may be used for a relatively accurate determination of the ambient temperature of the mobile device including internal temperature sensors. A temperature sensor situated outside of the mobile device, which measures the ambient temperature without being influenced by the device, is unnecessary.

One advantageous embodiment of the method according to the present invention provides that the ambient temperature ($T_{amb}$) is filtered in a fourth step (40) after the third step (30).

One advantageous embodiment of the method according to the present invention provides that at least one temperature value of at least one temperature sensor of the mobile device is measured for calculating the ambient temperature ($T_{amb}$) of the mobile device. Advantageously, the method according to the present invention may be used for determining the ambient temperature of the mobile device relatively precisely using only a few temperature sensors. In the simplest case, only one temperature sensor situated in the mobile device is sufficient for that purpose.

One advantageous embodiment of the method according to the present invention provides that the method is repeatedly carried out. Advantageously, this makes it possible to determine the ambient temperature of the mobile device continuously.

The present invention makes it possible to determine the thermal behavior using only one internal temperature sensor and the power consumption of the device. In contrast to the related art including multiple internal temperature sensors, the advantage of the present invention lies in the cost savings for additional internal temperature sensors.

BRIEF DESCRIPTION OF THE DRAWINGS

FIG. 4 shows the estimated ambient temperature of a mobile device and the measured temperature of an installed sensor.

DETAILED DESCRIPTION

Figure 1:
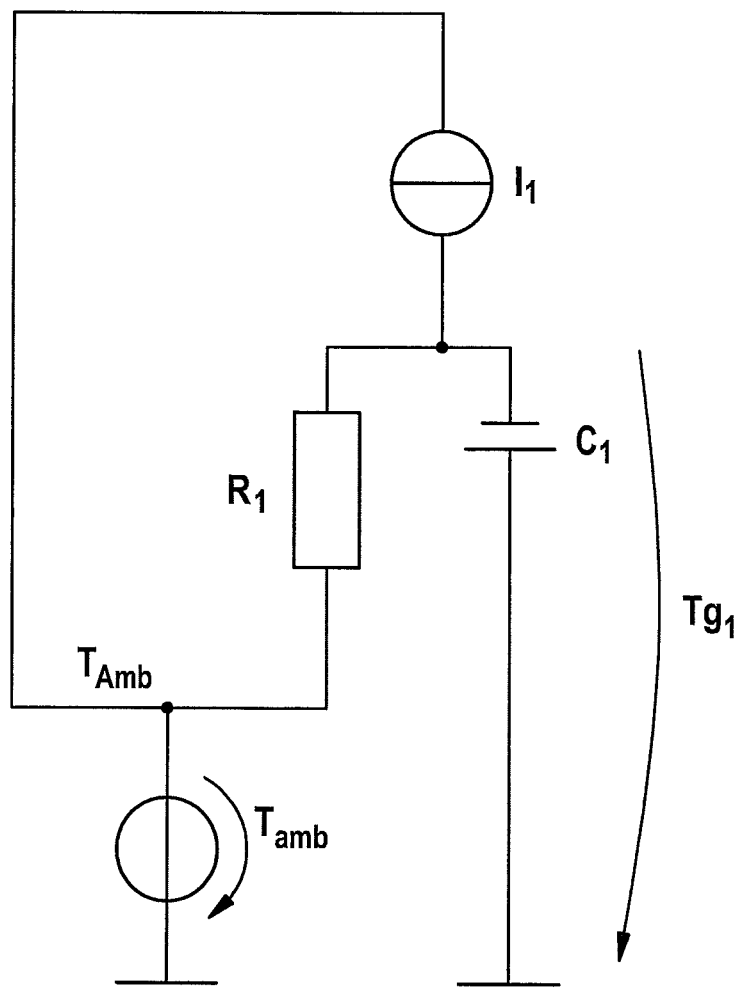
FIG. 1 shows the thermal equivalent circuit diagram of a smart phone from the related art including one temperature sensor.

FIG. 1 shows the thermal equivalent circuit diagram of a smart phone from the related art including one temperature sensor.

The analogy between thermal and electrical networks may be used for modeling the temperature behavior. For a first-order thermal network including one temperature sensor and a heat source, the equivalent circuit diagram shown in FIG. 1 is produced.

$$T_{amb}(t) = \frac{\partial T_{G1}(t)}{\partial t} C_1 R_1 - I_1(t) R_1 + T_{G1}(t) \quad (1)$$

$$C_1 R_1 = \tau$$

With the aid of equation (1), it is possible to ascertain the ambient temperature. Furthermore, an "accuracy statement" of the estimated temperature is also indicated.

The determination of the ambient temperature with the aid of equation (1) does not provide the desired result in all operating modes. The cause for this is that $C_1 R_1 = \tau$ is not constant, depending on the instantaneous operating condition of the smart phone. An incorrectly assumed time constant τ results in an imprecisely estimated ambient temperature. This is expressed in, among other things, overshooting the estimated ambient temperature after a sudden temperature change. Measurements show that the temperature measured by the sensor may be broken down into multiple phases after a sudden ambient temperature change.

The first is the heating of the sensor, which occurs rapidly and consequently results in a low τ.

The second is the heating of the printed circuit board onto which the sensor is soldered, which occurs somewhat slower and consequently results in a moderate τ.

The third is the heating of the entire telephone, which occurs the slowest and consequently results in a high τ.

The different phases are apparent in FIG. 4. Overshoots may be attenuated by a low pass. A disadvantage of this method is that the system consequently behaves sluggishly. This results in an increased setting time for the estimated temperature.

The user notices this effect and disadvantageously takes note of it.

Figure 2:
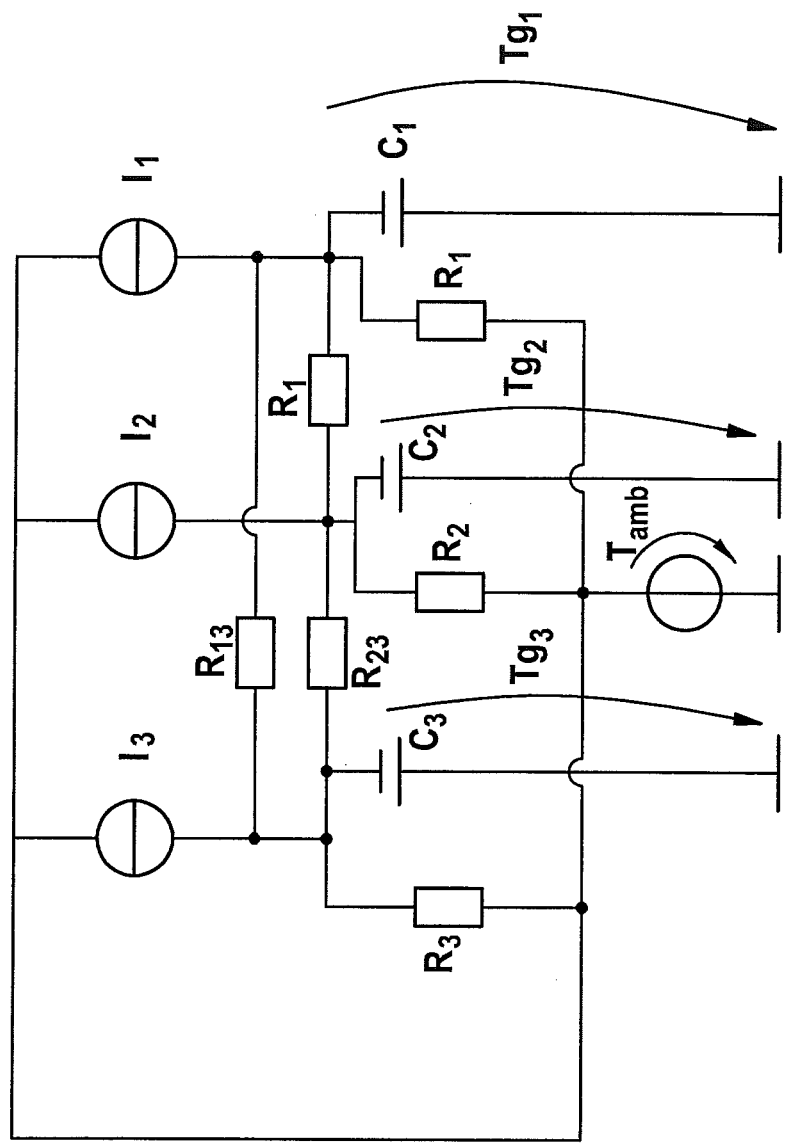
FIG. 2 shows the thermal equivalent circuit diagram of a smart phone from the related art including three temperature sensors.

FIG. 2 shows the thermal equivalent circuit diagram of a smart phone from the related art including three temperature sensors.

The temperature behavior may also be modeled in relation to the environment using multiple internal temperature sensors Tg1, Tg2, Tg3, different thermal resistances R1, R2, R3 or capacitances C1, C2, C3 and one resistor R12 and R23 each between the temperature measuring points, as shown in FIG. 2. It should be assumed here that Tg1 corresponds to the temperature of the sensor having low thermal resistance R1 and low capacitance C1. Furthermore, Tg2 corresponds to the temperature of the printed circuit board, onto which the temperature sensor is soldered, having moderate thermal resistance R2 and moderate capacitance C2. Finally, Tg3 corresponds to the temperature of the telephone containing the printed circuit board including the sensor, having high thermal resistance R3 and high capacitance C3.

If a sudden temperature change is now simulated, it is possible to observe the different phases in the temperature characteristic curve of the sensor, as described above.

Multiple internal temperature sensors aid in improving the estimation of the ambient temperature, since the different heating phases may be measured by the different temperature sensors. However, only a limited number of temperature sensors of equivalent quality are available in one device for economic reasons. The different phases of heating or cooling are described as examples in FIG. 1.

Different phases in the temperature characteristic curve may, among other things, be observed in the following events which represent different operating conditions. These include self-heating during normal use of the smart phone, charging the battery and changes in the ambient temperature such as, for example, a sudden ambient temperature change when moving into a different room, when entering a building, or when removing the device from a pants pocket, etc. Due to the different operating conditions, it is difficult to determine the ambient temperature even when multiple temperature sensors are installed.

The core of the present invention is a dynamic parameter adjustment. Dynamic parameter adjustment τ(t) makes it possible to model the different phases of the temperature characteristic curve. Consequently, the ambient temperature measurement may also be improved using a small number of internal temperature sensors. The ambient temperature may in particular also be determined using only one internal temperature sensor. This also makes it possible to avoid an overshoot in the estimated temperature characteristic curve.

Consequently, equation 2 applies to the ambient temperature as follows:

$$T_{amb}(t) = \frac{\partial T_{G1}(t)}{\partial t} C_1 R_1 - I_1(t) R_1 + T_{G1}(t) \quad (2)$$

$$C_1 R_1 = \tau(t)$$

Furthermore, the dynamic parameter adjustment is dependent on the operating condition. For that reason, the present invention also includes active detection of the instantaneous operating condition by analyzing the temperature sensor data and power consumption of the device.

An estimation of the accuracy of the temperature prediction is dependent on the operating condition and time. In addition, the estimation of the accuracy is based on the temperature sensor data and the power consumption of the smart phone.

Figure 3A:
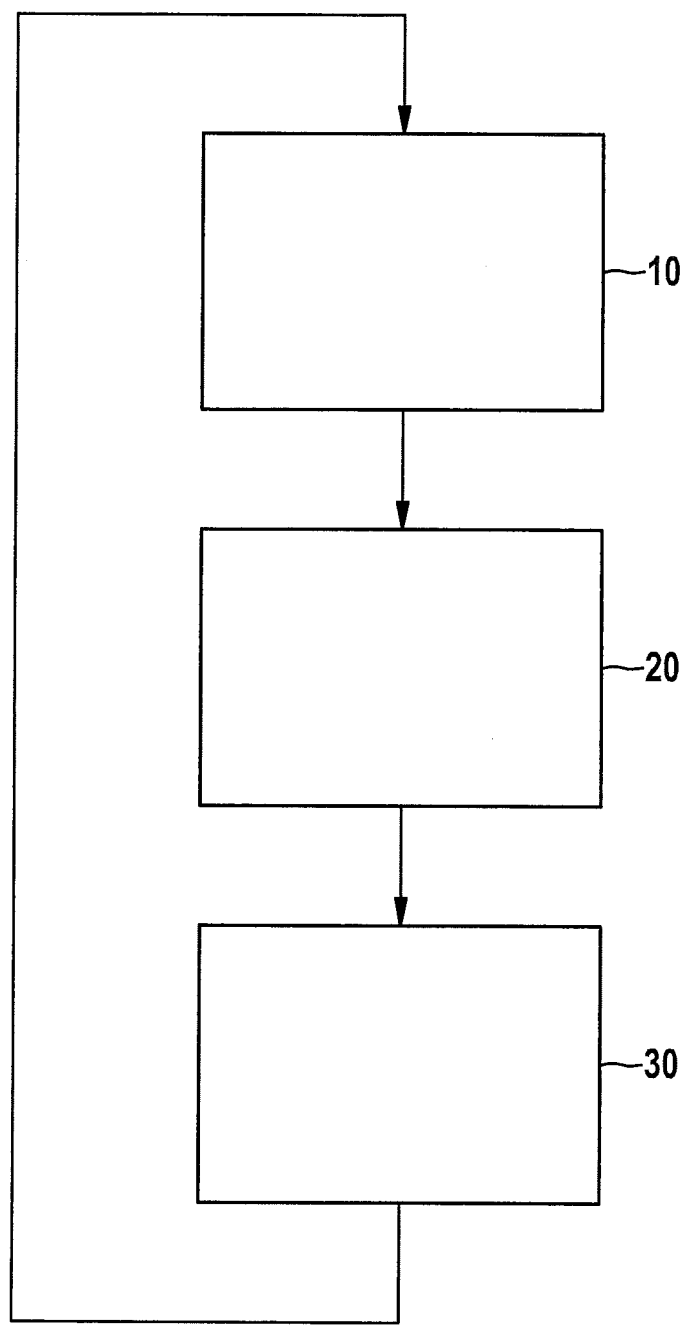
FIG. 3A shows a method according to the present invention for determining the ambient temperature of a mobile device in an exemplary embodiment.
Figure 3B:
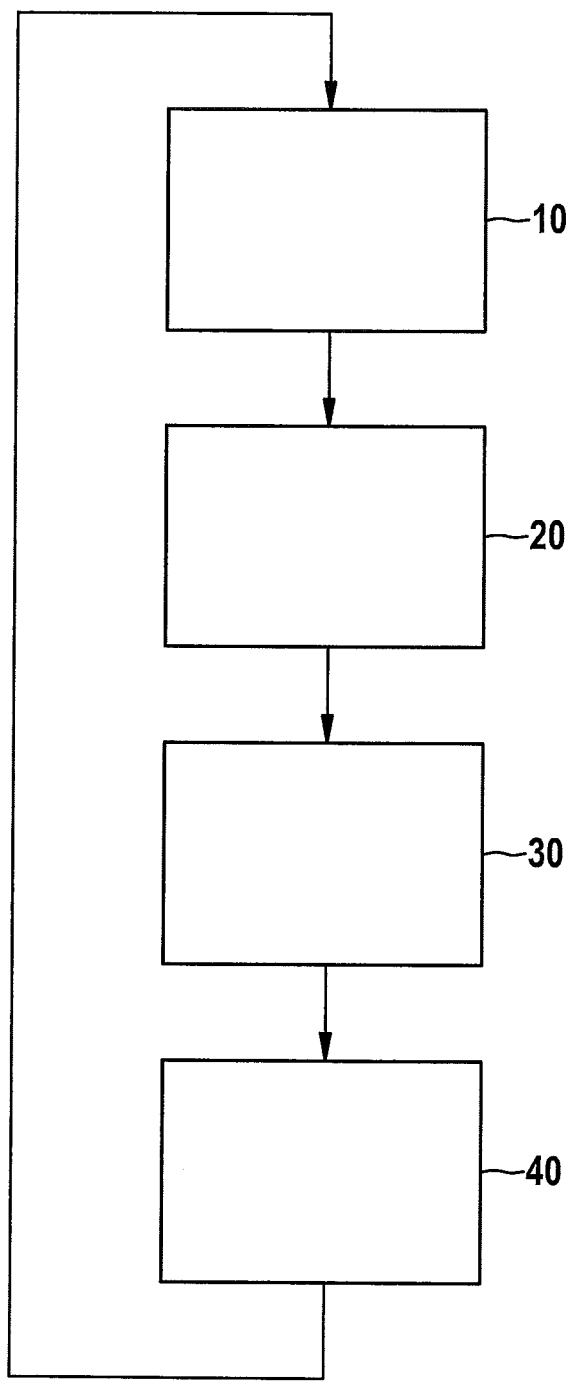
FIG. 3B shows a method according to the present invention for determining the ambient temperature of a mobile device in another exemplary embodiment.

FIGS. 3A and 3B show a method according to the present invention for determining the ambient temperature of a mobile device in two exemplary embodiments. The method includes an ambient temperature estimation and is broken down into at least three steps 10, 20 and 30 according to FIG. 3A.

At the beginning of the method, the operating condition of a mobile device, for example, a smart phone, is detected in a first step 10, i.e., the thermal condition of the device is ascertained.

The thermal condition is detected based on the instantaneous thermal condition, the self-heating and the measured value of the temperature sensor or the measured values of the temperature sensors.

A comparison of the second derivation of the measured temperature after time with a threshold value thr has proven to be an advantageous implementation for the detection of a sudden temperature change.

$$\text{abs}\left(\frac{\partial^2 T}{\partial t^2}\right) < thr$$

for time-discrete values $$\text{abs}\left(\frac{T(t) - 2 \cdot T(t - \Delta t) + T(t - 2\Delta t)}{\Delta t^2}\right) < thr$$

Advantageously, "temperature change phase 3 (heating of the entire telephone → slowly, high τ)," may be detected by $$thr_1 < \text{abs}\left(\frac{\frac{T(t) - T(t - \Delta t_1)}{\Delta t_1}}{\frac{T(t) - T(t - \Delta t_2)}{\Delta t_1}}\right) < thr_2 \ \& \text{abs}\left(\frac{T(t) - T(t - \Delta t_1)}{\Delta t_1}\right) > thr_3$$

In a second step 20, parameter (τ) is estimated as a function of the operating condition, the dwell time in the instantaneous operating condition (how long the instantaneous operating condition has already been detected), the self-heating and the measured values for the temperature. The above-described effect that the internal temperature curve may be modeled using different time constants is taken into account here. In parallel, the accuracy of the ambient temperature calculated later is estimated based on the input variables such as, for example, operating condition, and measured values for temperature and also the charge current. An accuracy statement of the estimated ambient temperature indicates the confidence range for the estimated ambient temperature and is consequently very helpful for using the ambient temperature.

The ambient temperature is calculated with the aid of the estimated time constant according to equation 1 in a third step 30.

Subsequently, the ambient temperature may optionally be filtered in a step 40, as shown in FIG. 3B. This takes place, for example, with the aid of a low pass filter, such as a second order IIR filter.

FIG. 4 shows estimated ambient temperature 100 of a mobile device and measured temperature 200 of an installed sensor. In the upper diagram, the actual ambient temperature is plotted as a reference temperature. This is a step function including overshoot because the mobile device is grasped and brought from a cold environment into a warm environment. Furthermore, the temperature of the mobile device is plotted as a telephone temperature in the upper diagram. This curve initially rises rapidly in the warm environment. A rapid temperature change signifies a low τ(t). After that, the rise in temperature levels off. This signifies a continuously rising τ(t). The telephone temperature approaches the ambient temperature over time. Only a slow temperature change occurs any more. This signifies a high constant τ(t). The curve of dynamic parameter τ(t) over time is correspondingly plotted in the lower diagram. Finally, the ambient temperature calculated with the aid of the dynamic parameter is plotted in the upper diagram. In most time domains, it reflects the instantaneous ambient temperature very well.

What is claimed is:

1. A method for determining the ambient temperature of a mobile device, the method comprising:
   determining, via a processor, an operating condition of the mobile device for determining a thermal condition of the mobile device, wherein the operating condition is determined by analyzing at least one temperature value of one internal temperature sensor and a power consumption of the mobile device;
   estimating, via the processor, a dynamic parameter which characterizes the thermal behavior of the mobile device; and
   calculating, via the processor, an ambient temperature of the mobile device with the aid of the dynamic parameter;
   wherein the at least one temperature value of the internal temperature sensor of the mobile device is measured for calculating the ambient temperature of the mobile device, and
   wherein the ambient temperature is based on a first-order thermal network model, which is as follows:

$$T_{amb}(t) = \frac{\partial T_{G1}(t)}{\partial t} C_1 R_1 - I_1(t) R_1 + T_{G1}(t) \quad (2)$$

$$C_1 R_1 = \tau(t)$$

where $T_{amb}(t)$ is the calculated ambient temperature, $T_{G1}$ is the measured temperature of the internal temperature sensor, $R_1$ represents a thermal resistance, $C_1$ represents a thermal capacitance, and where the dynamic parameter corresponds to τ(t) as represented by the product of $C_1 * R_1$ as a function of time.

2. The method of claim 1, wherein the ambient temperature is filtered after calculating the ambient temperature.

3. The method of claim 2, wherein the method is repeatedly carried out.

4. The method of claim 1, wherein at least one temperature value of at least one temperature sensor of the mobile device is measured for calculating the ambient temperature of the mobile device.

5. The method of claim 4, wherein the method is repeatedly carried out.

6. The method of claim 1, wherein the method is repeatedly carried out.

7. The method of claim 1, wherein the operating condition includes at least one of self-heating during normal operation of the mobile device, charging a battery of the mobile device, or changes in an ambient temperature outside of the mobile device.

8. The method of claim 1, wherein the dynamic parameter of τ(t) is estimated as a function of the operating condition, a dwell time in an instantaneous operating condition, a self-heating of the mobile device, and the at least one temperature value of the one internal temperature sensor.

9. The method of claim 1, wherein an accuracy statement of the estimated ambient temperature is determined to indicate a confidence range for the estimated ambient temperature.

* * * * *